United States Patent [19]
Hammerel

[11] 3,937,329
[45] Feb. 10, 1976

[54] SHEET GLASS SUPPORTING RACK
[75] Inventor: James T. Hammerel, Emeryville, Calif.
[73] Assignee: Cobbledick-Kibbe Glass Company, Oakland, Calif.
[22] Filed: Aug. 12, 1974
[21] Appl. No.: 496,499

[52] U.S. Cl............... 211/41; 214/10.5 R; 280/79.3
[51] Int. Cl.²......................................... A47G 19/08
[58] Field of Search............ 211/13, 41, 49, 50, 60, 211/40; 214/10.5 R, 6 R, 1 S, 15 W, 10.5; 280/47.17, 47.19, 47.24, 47.34, 47.35, 79, 79.3; 107, 179; 220/97 C; 296/35

[56] References Cited
UNITED STATES PATENTS

| 2,518,624 | 8/1950 | Kraft................... 211/41 X |
| 2,815,861 | 12/1957 | Schodorf, Sr.................. 211/13 |
| 2,839,198 | 6/1958 | Lefevre................... 211/41 |
| 2,940,402 | 6/1960 | Hansen et al................... 211/41 X |
| 3,233,753 | 2/1966 | Rich................... 214/10.5 R |
| 3,424,487 | 1/1969 | Pector et al................... 211/41 |
| 3,596,755 | 8/1971 | Bundy et al................ 214/10.5 R X |

Primary Examiner—Roy D. Frazier
Assistant Examiner—Terrell P. Lewis
Attorney, Agent, or Firm—Townsend and Townsend

[57] ABSTRACT

An outrigger construction that modifies after delivery for a rack used to transport rectangular sections of sheet products such as flat glass is disclosed. Such racks have an A-frame configuration with generally horizontal platforms at the base extremities of each side. Sheet products stacked on the platforms lean against an adjacent inclined side of the A-frame for transportaion of the products. The outrigger construction of the invention provides for installing after delivery vertical columnar members on each side of the A-frame so that the outermost sheet products on the A-frame can be tilted outwardly from their position against the A-frame. The outermost sheets thus lean against the vertical columnar members to allow direct access to interior sheet products on the rack.

5 Claims, 3 Drawing Figures

U.S. Patent  Feb. 10, 1976  3,937,329
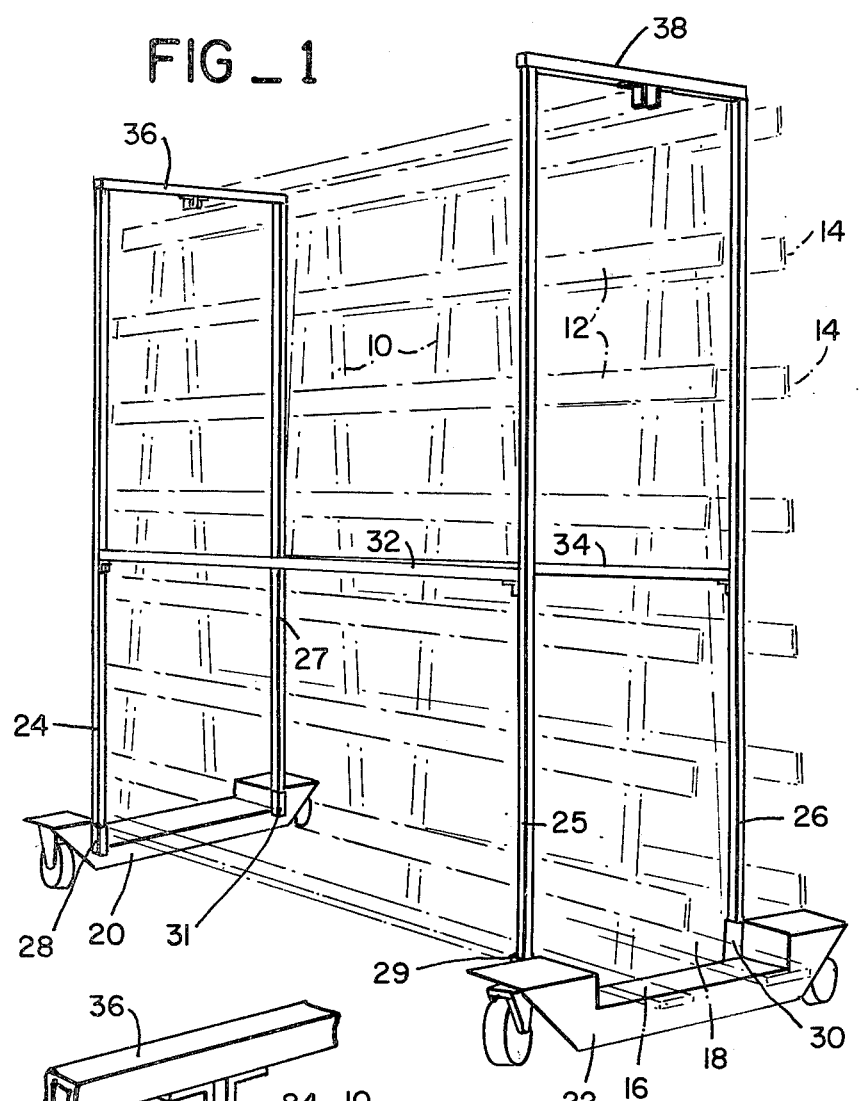
FIG_1
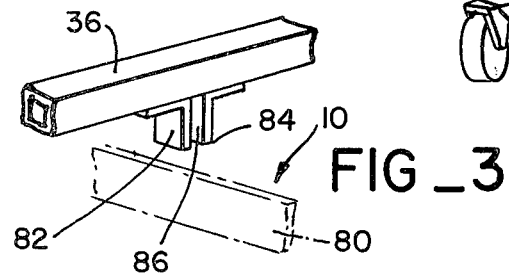
FIG_3
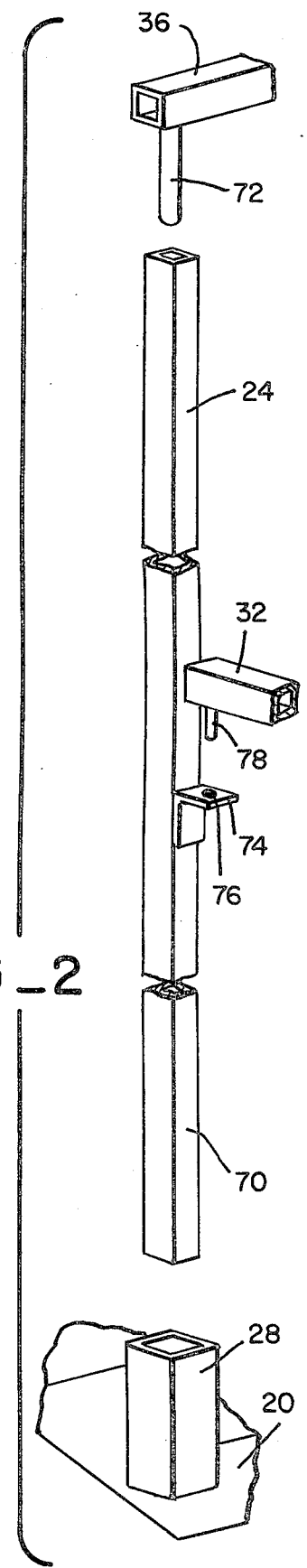
FIG_2

SHEET GLASS SUPPORTING RACK

BACKGROUND OF THE INVENTION

The present invention relates to racks for sheet products, and in particular to an outrigger construction allowing immediate access to interior sheet products stacked on an A-frame rack.

Large sheets of flat glass are ordinarily transported from place to place on special trucks which have a pair of A-frames arranged side by side on the truckbed. Platforms are located adjacent to the lower extremities of the A-frames, and flat glass stacked thereon leans against the adjacent side of the A-frame and is supported thereby.

A recently developed method of transporting flat glass is illustrated in my co-pending application for TRANSPORTATION RACK CONSTRUCTION, Ser. No. 465,043. In this system, transportable A-frame racks are utilized to support the glass. The racks with the glass thereon can be moved either on dollies or placed on trucks for long distance transportation. This method of transporting flat glass has been found to be quite efficient, with one exception, namely, either the entire block must be removed at one time or if each piece of glass is a different size, all of the outside sheets of glass must be removed before an interior sheet can be taken off the rack.

SUMMARY OF THE INVENTION

The present invention provides an outrigger construction which includes vertical columnar members on each side of the A-frame, and laterally projecting members for supporting the various columnar members at their base. All or any part of the products on the A-frame can be tilted from their base leaning position against the A-frame so that they can lean against the vertical columnar members. This allows access to any interior sheet product so that it can be removed without having removed any other sheet, thus, eliminating the need for first removing all of the sheet products outside of the desired sheet before that sheet can be removed from the rack.

In the preferred embodiment of the present invention, two vertical columnar members are disposed on each side of the A-frame on the opposite corners thereof. Horizontal members interconnect the two members on each respective side of the A-frame, and cross-members attached to the top of the A-frame connect to the top of the vertical columnar members to provide a relatively rigid outrigger construction. Each of the members of the outrigger construction is demountably attached to the A-frame and to each other so that the entire structure can be assembled and disassembled at will. When disassembled, the members forming the rack can be easily stored and transported along with the glass. As a result, the outrigger construction can be disassembled for transportation of the glass and erected at the dealer's shop to facilitate storing and utilizing the glass as required.

The novel features which are believed to be characteristic of the invention, both as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the outrigger construction of the present invention mounted to a transportable A-frame rack;

FIG. 2 is an exploded perspective view illustrating the interaction of the various members of the present invention;

FIG. 3 is a fragmentary perspective view of the attachment of the cross member of the present invention to the top of the A-frame rack.

DESCRIPTION OF THE PREFERRED EMBODIMENTS

The apparatus of the present invention used with a transportable A-frame rack 10 is illustrated by way of reference to FIG. 1. Rack 10 has two downwardly divergent inclined sides defined by rows of boards 12, 14. Platforms 16, 18 are provided at the base extremities of each side of the A-frame rack 10. Flat glass or other sheet products such as sheet rock, plywood panels, etc. can be stacked on platform 16, 18 so that they lean against the respective sides of the rack defined by boards 12, 14 for transportation of the products. In the apparatus illustrated in FIG. 1, A-frame rack 10 can be moved on dollies 20, 22 for short-distance transportation of the glass at the warehouse or at the construction site. For long-distance transportation of the flat glass such as from a warehouse to a construction site, or customer's warehouse, A-frame rack 10 can be loaded on a truck at the warehouse, as illustrated in my aforementioned Patent Application for Transportation Rack Construction, and then unloaded at the construction site or a customer's warehouse.

The present invention provides an outrigger construction adapted to surround A-frame rack 10. The outrigger construction includes vertical columnar members 24–27 disposed at the four corners of the rack. Columnar members 24–27 are rectangular extrusions and fit inside mating, upperly opening slots 28–31 on dollies 20, 22. A pair of horizontal members 32, 34 interconnect the vertical columnar members 24–25 and 26–27 respectively on the opposite sides of A-frame rack 10. In addition, cross members 36, 38, mounted to the top of A-frame rack 10, are connected to the top of the vertical columnar members 24–27 and 25–26 respectively. The combination of vertical columnar members 24–27 mounted in upwardly opening slots 28–31, horizontal members 32, 34 and cross members 36, 38 provide a rigid outrigger construction enclosing the glass or other sheet products mounted on A-frame rack 10. As is apparent from viewing FIG. 1, the outermost such sheet products can be tilted away from the sides of A-frame rack 10 so that they lean against vertical columnar members 24, 25 or 26, 27. This allows easy access to interior sheet products mounted on A-frame rack 10 without the necessity for first removing the outer sheet products.

The assembly of the outrigger construction is illustrated in more detail by way of reference to FIG. 3. Using reference numerals related to one of the vertical columnar members 24 illustrated previously, the lower end 70 thereof is insertable into upwardly opening rectangular slot 28 in dolly 20. Columnar member 24 is a hollow extrusion so that a downwardly projecting peg 72 at the outer extremity of cross member 36 can releasably engage therewith. Angle 74 is mounted to the side of vertical columnar 24 and is provided with a small aperture 76 so that downwardly projecting peg 78 at the end of horizontal member 32 can be inserted thereinto. In this manner, vertical columnar member 24 is connected with dolly 20, cross member 36, and horizontal member 32 to hold it firmly in position so that flat glass and other sheet products can be leaned against it. However, the outrigger construction can easily be disassembled when not needed, such as for long-distance transportation of the glass.

Connection of a cross member such as 36 to the top of A-frame 10 is illustrated by way of reference to FIG. 3. A-frame 10 is provided with a flat, vertically aligned member 80 which forms the apex of the rack. A pair of angles 82, 84 on lower surface of cross member 36 define a slot 86. Cross member 36 can be mounted over member 80 of A-frame rack 10 so that slot 86 is engaged therewith to firmly mount the cross member to the rack.

In operation, flat glass or other such sheet products can be loaded on an A-frame in any order irrespective of the order of use. When the sheet products are to be unloaded from an A-frame, vertical columnar members such as 24–27 are inserted in upwardly opening slots 28–31. Horizontal members 32, 34 are then attached to the cross members on the respective sides of the A-frame by inserting pegs such as 78 in corresponding slots such as 76. Then, cross members 36, 38 are attached to the tops of the vertical columnar members by inserting pegs such as 72 inside the vertical members. This provides a rigid outrigger construction against which the sheet products can be tilted for removal of interior sheets. When the outrigger construction is no longer needed, it can easily be disassembled without using any special tools and stored for future use.

While preferred embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

What I claim as new is:

1. A rack for supporting rectangular sections of sheet products comprising:
   an A-frame defining opposite downwardly divergent inclined sides;
   means located adjacent the base extremities of each inclined side for engaging the bottom edges of and supporting the primary weight of sheet products stacked thereon, said stacked sheet products adapted to normally lean toward and against an adjacent inclined side of said A-frame;
   at least one substantially vertical columnar member disposed to each side of said A-frame and spaced laterally from the sheet products on said frame; and
   laterally projecting support means provided on each side of said A-frame for supporting each said columnar member at its base in a location spaced laterally outwardly from the base extremities of its adjacent inclined side, whereby sheet products supported on said A-frame can be successively tilted from their leaning position toward and against an adjacent inclined side to a leaning and substantially upright position toward and against an adjacent columnar support.

2. A rack as recited in claim 1 and comprising a pair of substantially vertical columnar members disposed to each side of the A-frame, said members located at the opposite corners of the A-frame, and additionally comprising a horizontal member interconnecting the respective members of each pair of vertical columnar members.

3. A rack as recited in claim 2 and additionally comprising a pair of cross members attached to the top of the A-frame, the extremities of said cross members demountably connected to the top of the vertical columnar members to maintain said vertical members in position.

4. A rack as recited in claim 1 wherein the laterally projecting support means comprises a pair of dollies adapted to underlie and support the A-frame for movement of said A-frame over the ground.

5. A system for the transportation and storing of flat glass, said system comprising:
   an A-frame defining opposite, downwardly divergent, inclined sides and having means at the lower base extremities of each inclined side for supporting flat glass stacked thereon so that the flat glass leans against the adjacent inclined side of the A-frame;
   a pair of dollies adapted to support the A-frame for transportation thereof, each said dolly having a pair of laterally disposed upwardly opening slots;
   a set of four vertical columnar members adapted to be placed in the upwardly opening slots in the dollies and extend upwardly adjacent the diverging inclined sides of the A-frame;
   a pair of cross members demountably attachable to the upper end of the A-frame, the extremities of said cross members adapted to demountably engage the upper ends of respective pairs of the vertical columnar members respectively and maintain said vertical members in a substantially vertical configuration; and
   a pair of horizontal members adapted to demountably engage adjacent vertical columnar members on the respective sides of the A-frame to provide a rigid outrigger frame about the A-frame so that flat glass supported against the inclined sides of the A-frame can be tilted outwardly and against the vertical columnar members to provide access to interior sheets of flat glass.

* * * * *